US011608008B2

(12) United States Patent
Barrow et al.

(10) Patent No.: US 11,608,008 B2
(45) Date of Patent: Mar. 21, 2023

(54) ILLUMINATED SPEAKER PANEL ASSEMBLY WITH INTEGRATED AUDIO SEAL

(71) Applicant: Honda Motor Co., Ltd., Tokyo (JP)

(72) Inventors: Andrew E. Barrow, Hilliard, OH (US); Eric Ma, London (GB); Jason R. Dilley, Plain City, OH (US); Sarah Jennifer Huth, Dublin, OH (US); Rachel E. Canepa, Marysville, OH (US); Ryan W. Van Voorhis, Powell, OH (US); John Michael Schermerhorn, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 545 days.

(21) Appl. No.: 16/589,084

(22) Filed: Sep. 30, 2019

(65) Prior Publication Data

US 2021/0094479 A1    Apr. 1, 2021

(51) Int. Cl.
| | |
|---|---|
| *B60R 11/02* | (2006.01) |
| *H04R 1/02* | (2006.01) |
| *F21V 33/00* | (2006.01) |
| *B60R 11/00* | (2006.01) |

(52) U.S. Cl.
CPC ...... *B60R 11/0217* (2013.01); *F21V 33/0056* (2013.01); *H04R 1/023* (2013.01); *H04R 1/025* (2013.01); *H04R 1/028* (2013.01); *B60R 2011/0021* (2013.01); *H04R 2499/13* (2013.01)

(58) Field of Classification Search
CPC ......... B60R 11/0217; B60R 2011/0021; F21V 33/0056; H04R 1/023; H04R 1/025; H04R 1/028; H04R 2499/13; B60Q 3/20; B60Q 3/217; B60Q 3/64; G02B 6/001
See application file for complete search history.

(56) References Cited

U.S. PATENT DOCUMENTS

| | | | | |
|---|---|---|---|---|
| 5,434,013 A | * | 7/1995 | Fernandez | B60Q 1/323 |
| | | | | 428/917 |
| 6,000,493 A | * | 12/1999 | Chen | H04R 1/028 |
| | | | | 362/86 |
| 6,545,418 B1 | | 4/2003 | Kolpasky et al. | |

(Continued)

FOREIGN PATENT DOCUMENTS

| | | |
|---|---|---|
| CN | 2372853 Y | 4/2000 |
| DE | 102016122078 A1 | 6/2017 |

(Continued)

*Primary Examiner* — Oyesola C Ojo
(74) *Attorney, Agent, or Firm* — Plumsea Law Group, LLC

(57) ABSTRACT

An illuminated speaker panel assembly with an integrated audio seal is described. In one embodiment, an illuminated speaker panel assembly for a vehicle includes a speaker configured to mount to a door body of a vehicle and a base panel component configured to attach to the door body over the speaker. The base panel component includes a speaker frame aligned with an outer periphery of the speaker. The speaker frame includes an outer sealing wall, an inner retention wall, and a channel disposed between the outer sealing wall and the inner retention wall. A lighting member is disposed within the channel of the speaker frame such that the lighting member is configured to extend substantially along the outer periphery of the speaker.

18 Claims, 7 Drawing Sheets

(56) References Cited

U.S. PATENT DOCUMENTS

| | | | |
|---|---|---|---|
| 7,237,933 B2* | 7/2007 | Radu | B60Q 3/745 |
| | | | 296/146.7 |
| 7,708,417 B2 | 5/2010 | King | |
| 8,876,352 B2* | 11/2014 | Robbins | B60Q 3/225 |
| | | | 362/605 |
| 9,464,803 B2 | 10/2016 | Salter et al. | |
| 10,093,225 B2 | 10/2018 | Salter et al. | |
| 2003/0096510 A1* | 5/2003 | Morrison | B60J 5/0416 |
| | | | 439/34 |
| 2004/0105567 A1* | 6/2004 | Kurihara | B60R 11/0217 |
| | | | 381/387 |
| 2004/0175014 A1 | 9/2004 | Liu | |
| 2006/0151981 A1* | 7/2006 | Wakou | B60R 21/0428 |
| | | | 280/751 |
| 2007/0154705 A1* | 7/2007 | Doeppner | B32B 17/10541 |
| | | | 156/99 |
| 2016/0080847 A1* | 3/2016 | Hofmann | H04R 1/028 |
| | | | 381/391 |
| 2016/0084493 A1* | 3/2016 | Salter | B60Q 3/64 |
| | | | 362/510 |
| 2016/0347244 A1* | 12/2016 | Asada | B60Q 3/78 |
| 2017/0311062 A1 | 10/2017 | Garrett et al. | |
| 2020/0317122 A1* | 10/2020 | Mihira | B60J 5/00 |

FOREIGN PATENT DOCUMENTS

| | | |
|---|---|---|
| KR | 20060026165 A | 3/2006 |
| KR | 20130003957 U | 7/2013 |

\* cited by examiner

ILLUMINATED SPEAKER PANEL ASSEMBLY WITH INTEGRATED AUDIO SEAL

BACKGROUND

Modern vehicles usually include a variety of different speakers within the interior passenger compartment of the vehicle. Typically, in-vehicle audio systems include multiple speakers arranged throughout the vehicle, including tweeters, subwoofers, mid-range, full-range, etc. For example, vehicles can have one or more speakers installed within the door panels of the interior passenger compartment, as well as other locations, such as in the dashboard and the rear of the vehicle.

Additionally, many automotive manufacturers now offer high-end audio systems for their vehicles as an optional package. As a result, consumers expect high-quality sound and performance from in-vehicle audio systems.

SUMMARY

In one aspect, an illuminated speaker panel assembly for a vehicle is provided, the illuminated speaker panel assembly comprising: a speaker configured to mount to a door body of a vehicle; a base panel component configured to attach to the door body over the speaker, the base panel component including a speaker frame aligned with an outer periphery of the speaker, the speaker frame comprising: an outer sealing wall; an inner retention wall; and a channel disposed between the outer sealing wall and the inner retention wall; and a lighting member disposed within the channel of the speaker frame, wherein the lighting member is configured to extend substantially along the outer periphery of the speaker.

In another aspect, a lighting assembly of a speaker panel assembly for a vehicle is provided, the lighting assembly comprising: a lighting member having an approximately circular cross-sectional shape and configured to extend substantially around an outer periphery of a speaker; a light source configured to illuminate the lighting member; and a lighting member holder configured to retain a first end of the lighting member in communication with the light source.

In still another aspect, an illuminated speaker panel assembly for a vehicle is provided comprising: a base panel component configured to attach to a door body of a vehicle, the base panel component including a speaker frame comprising: an outer sealing wall; an inner retention wall; and a channel disposed between the outer sealing wall and the inner retention wall; a lighting assembly comprising: a lighting member disposed within the channel of the speaker frame, the lighting member having an approximately circular cross-sectional shape; a light source configured to illuminate the lighting member; and a lighting member holder attached to the base panel component, the lighting member holder configured to retain a first end of the lighting member in communication with the light source; a grille configured to be exposed to an interior of the vehicle; and a lining layer disposed between the grille and the base panel component.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

As described above, vehicles include various speakers within the interior passenger compartment. Typically, speakers within the vehicle are not sealed by a surrounding speaker grille. The present embodiments provide an illuminated speaker panel assembly for a door body of a vehicle with an integrated audio seal. According to the techniques described herein, the illuminated speaker panel assembly with the integrated audio seal provides both illumination and an audio seal to a speaker installed within the door body of the vehicle. With this arrangement, improved audio performance and visual appeal is provided within the passenger compartment of the vehicle.

Figure 1:
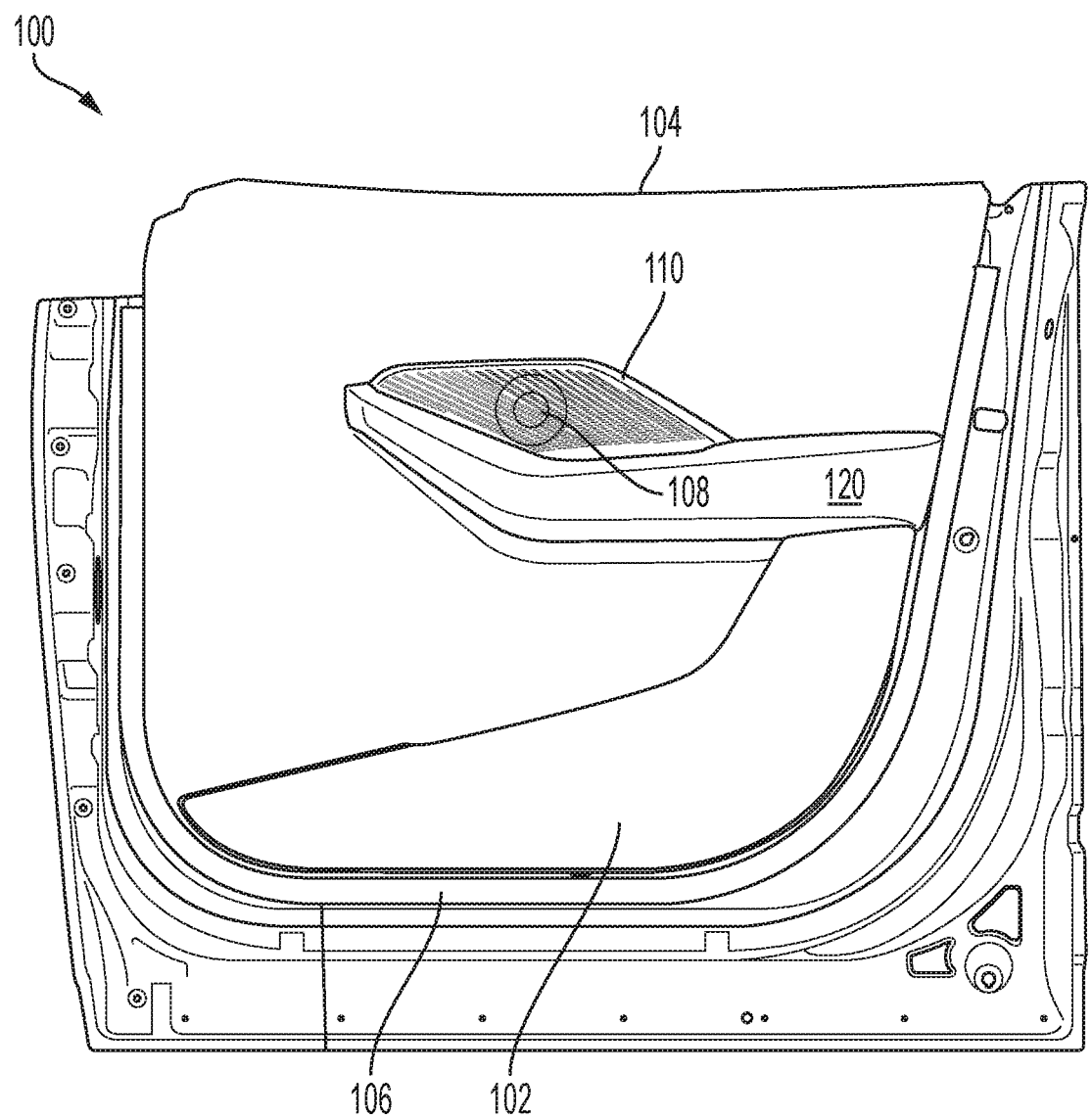
FIG. 1 is a schematic view of a door body including an example embodiment of an illuminated speaker panel assembly.

Referring now to FIG. 1, a schematic view of a door body 100 including an interior door panel 102 and an example embodiment of an illuminated speaker panel assembly 110. In an example embodiment, door body 100 may be associated with any type of motor vehicle. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In this embodiment, door body 100 includes interior door panel 102 facing inwards towards the interior passenger compartment of the vehicle. Interior door panel 102 extends from a top edge 104 to a bottom edge 106. In some embodiments, one or more speakers associated with an audio system of the vehicle may be mounted or installed within door body 100. For example, in this embodiment, a speaker 108, such as a tweeter or other type of speaker, is provided in door body 100 and is covered by illuminated speaker panel assembly 110. As shown in FIG. 1, speaker 108 and illuminated speaker panel assembly 110 are located above an armrest 120 on interior door panel 102. It should be understood, however, that in other embodiments, one or more speakers associated with the audio system of the vehicle, including speaker 108, may be located at other areas of interior door panel 102 and/or other locations within the interior of the vehicle.

As will be described in more detail below, illuminated speaker panel assembly 110 of the present embodiments includes a lighting mechanism that is integrated into an audio seal of illuminated speaker panel assembly 110 so as to provide both illumination and audio sealing to speaker 108.

Figure 2:
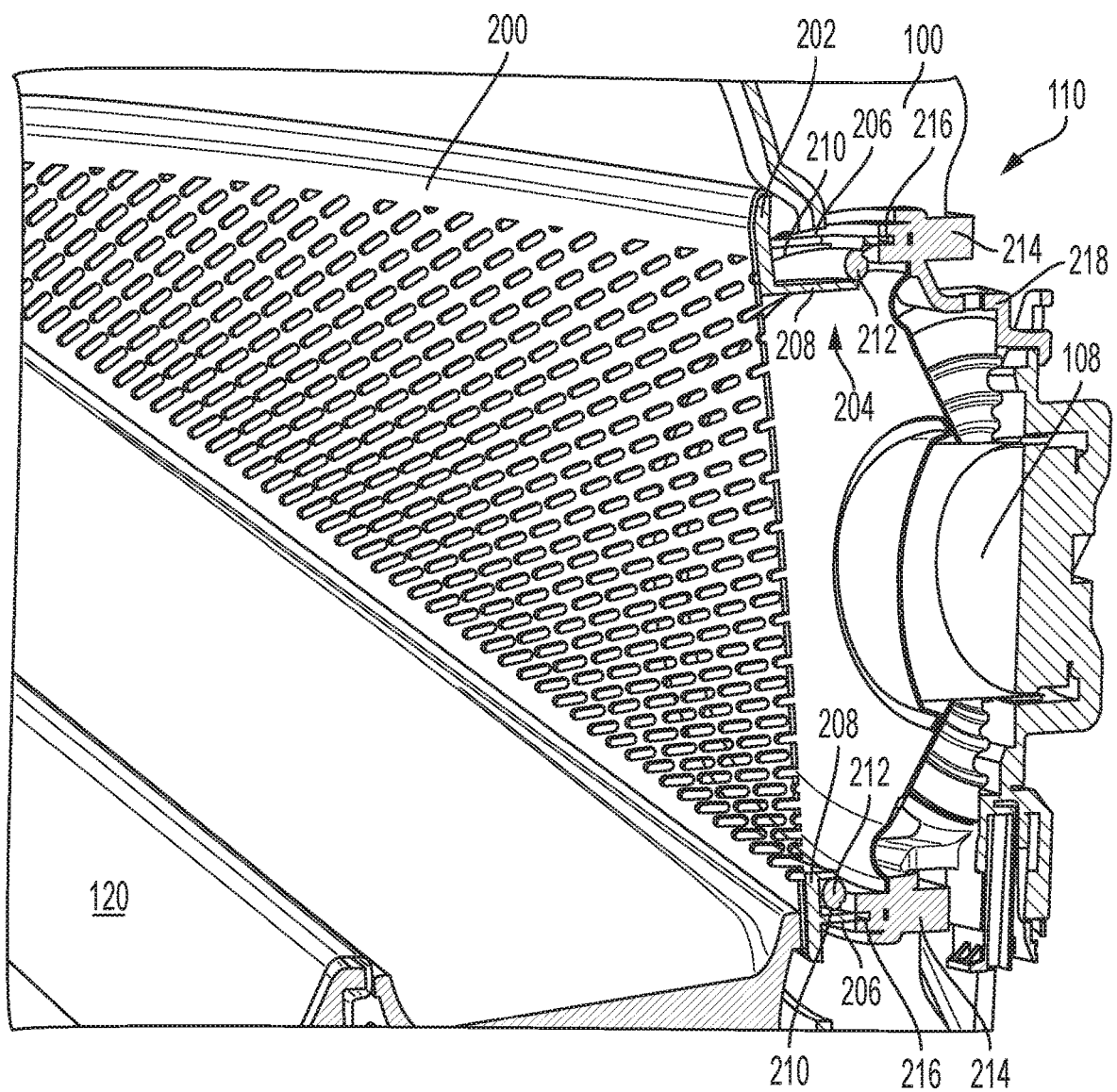
FIG. 2 is an isometric cutaway view of the example embodiment of an illuminated speaker panel assembly shown in FIG. 1.

FIG. 2 is an isometric cutaway view of the example embodiment of an illuminated speaker panel assembly 110 shown in FIG. 1. In this embodiment, speaker 108 is mounted to door body 100 of the vehicle. Illuminated speaker panel assembly 110 is configured to attach to door body 100 and fit over or cover speaker 108. In this embodiment, illuminated speaker panel assembly 110 includes a grille 200. Grille 200 is exposed to the interior of the passenger compartment of the vehicle. In an example embodiment, grille 200 includes a plurality of holes or openings that are configured to allow sound to pass through grille 200. Additionally, the plurality of holes or openings in grille 200 allow light from illuminated speaker panel assembly 110 to pass through so that speaker 108 may be visible through grille 200 by an occupant within the passenger compartment of the vehicle. In one embodiment, grille 200 may be made of stainless steel. In other embodiments, grille 200 may be made of any suitable material or combination of materials, including, but not limited to metal, plastic, polymer, and/or other materials.

In an example embodiment, illuminated speaker panel assembly 110 also includes a base panel component 202. Base panel component 202 is configured to attach illuminated speaker panel assembly 110 to door body 100 over speaker 108. In this embodiment, base panel component 202 includes a speaker frame 204 that is aligned with an outer periphery 218 of speaker 108. In an example embodiment, speaker frame 204 of base panel component 202 includes a pair of concentric walls that extend outward from base panel component 202 towards door body 100.

In this embodiment, the pair of concentric walls forming speaker frame 204 include an outer sealing wall 206 and an inner retention wall 208. In an example embodiment, speaker frame 204 of illuminated speaker panel assembly 110 also includes a channel 210 disposed between outer sealing wall 206 and inner retention wall 208. In this embodiment, outer sealing wall 206 extends outward from base panel component 202 farther than inner retention wall 208. Together, outer sealing wall 206 and inner retention wall 208 form walls that define the sides of channel 210.

In an example embodiment, speaker frame 204 of illuminated speaker panel assembly 110 has a shape that corresponds with a shape of speaker 108. For example, in one embodiment, outer periphery 218 of speaker 108 defines a substantially circular shape and speaker frame 204 of illuminated speaker panel assembly 110 has a substantially similar circular shape that corresponds to speaker 108 so that speaker frame 204 is aligned with outer periphery 218 of speaker 108. In other embodiments, however, speaker 108 and speaker frame 204 may have other shapes, such as, oval, square, triangular, or other geometric or non-geometric shapes.

In some embodiments, illuminated speaker panel assembly 110 includes a lighting member 212. In an example embodiment, lighting member 212 is disposed within channel 210 of speaker frame 204. As shown in FIG. 2, lighting member 212 is integrated within channel 210 of speaker frame 204 and is bounded on two sides by outer sealing wall 206 and inner retention wall 208. In an example embodiment, lighting member 212 is configured to extend substantially along the outer periphery of speaker 108. In some embodiments, lighting member 212 is a light pipe or other mechanism that is configured to carry or transmit light provided from a light source (shown in FIG. 5 below) throughout the length of lighting member 212. For example, in an example embodiment, lighting member 212 may be made from a clear acrylic material. In other embodiments, lighting member 212 may be made from other suitable materials for carrying light, including fiber optic materials, including, but not limited to glass, polymers, and combinations of glass and polymers.

In an example embodiment, illuminated speaker panel assembly 110 may include an integrated audio seal. As shown in FIG. 2, in this embodiment, a seal 214 surrounds the outer periphery of speaker 108. In some embodiments, seal 214 may be a foam gasket or similar component. For example, in one embodiment, seal 214 may be made of an ethylene propylene diene terpolymer or ethylene propylene diene monomer. In other embodiments, seal 214 may be made of any suitable material, including, but not limited to rubber, polymer, foam, or similar material.

In an example embodiment, seal 214 is configured to mate or connect with a portion of speaker frame 204 so as to form an audio seal around speaker 108. In one embodiment, seal 214 includes a groove 216 that is configured to receive outer sealing wall 206 of speaker frame 204. Groove 216 is disposed approximately in the middle of seal 214 and faces towards speaker frame 204 away from speaker 108. As shown in FIG. 2, a portion of outer sealing wall 206 fits into groove 216 of seal 214 surrounding the outer periphery of speaker 108. With this arrangement, outer sealing wall 206, inner retention wall 208, lighting member 212, and seal 214 cooperate to provide an audio seal for speaker 108.

Figure 3:
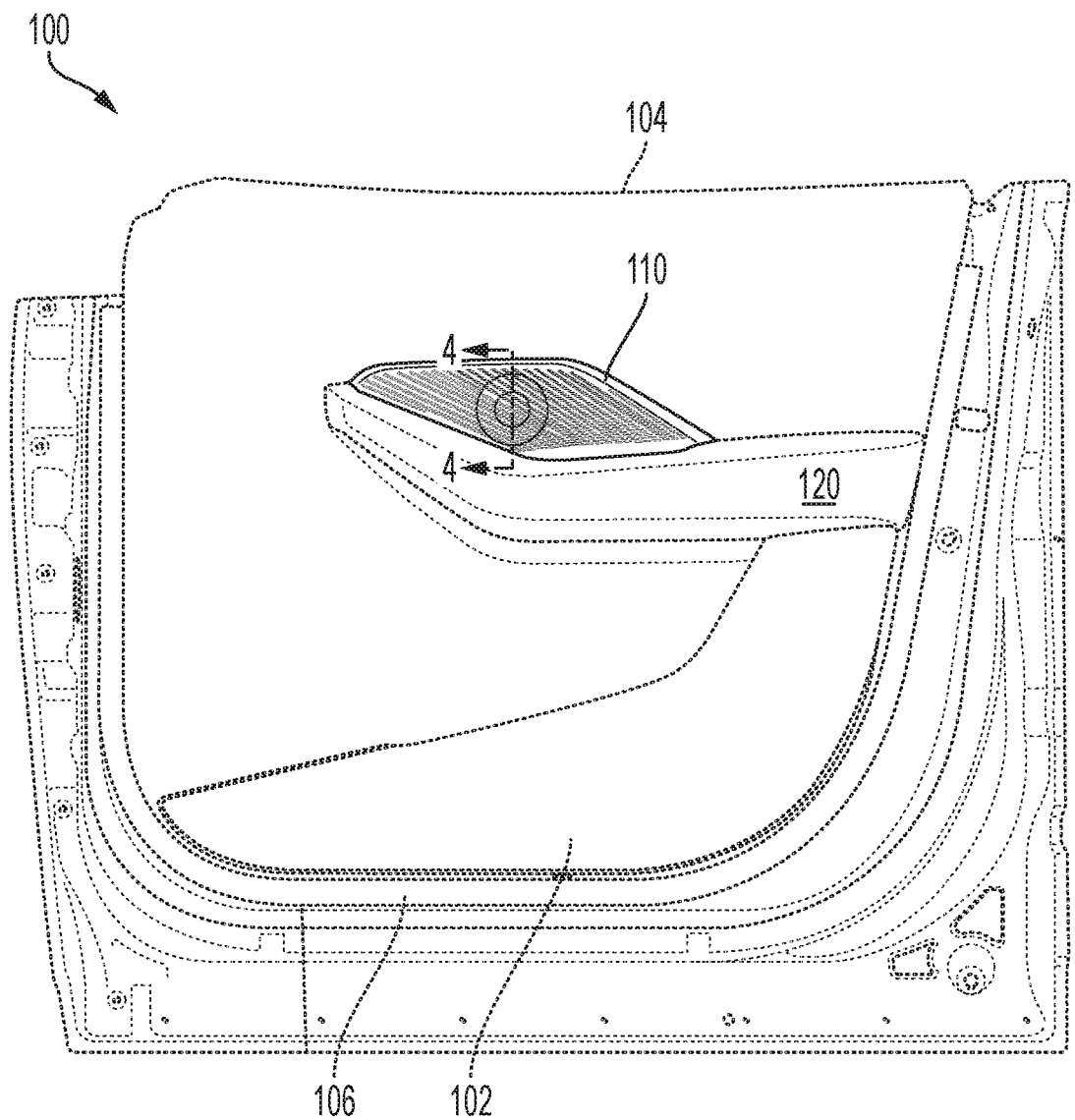
FIG. 3 is a schematic view of the example embodiment of an illuminated speaker panel assembly with the surrounding door panel shown in outline.

FIG. 3 is a schematic view of the example embodiment of illuminated speaker panel assembly 110 with the surrounding interior door panel 102 shown in outline. In this embodiment, illuminated speaker panel assembly 110 is located nearer to top edge 104 of interior door panel 102 than bottom edge 106 of interior door panel 102. Additionally, as shown in FIG. 3, illuminated speaker panel assembly 110 is located above armrest 120 disposed on interior door panel 102. In some embodiments, armrest 120 may include various switches, including window and/or door lock switches. It should be understood, however, that the example embodiments of an illuminated speaker panel assembly described herein may be located at different locations within the interior passenger compartment of the vehicle, including different placements on interior door panel 102, as well as at other locations on different components within the interior passenger compartment.

Figure 4:
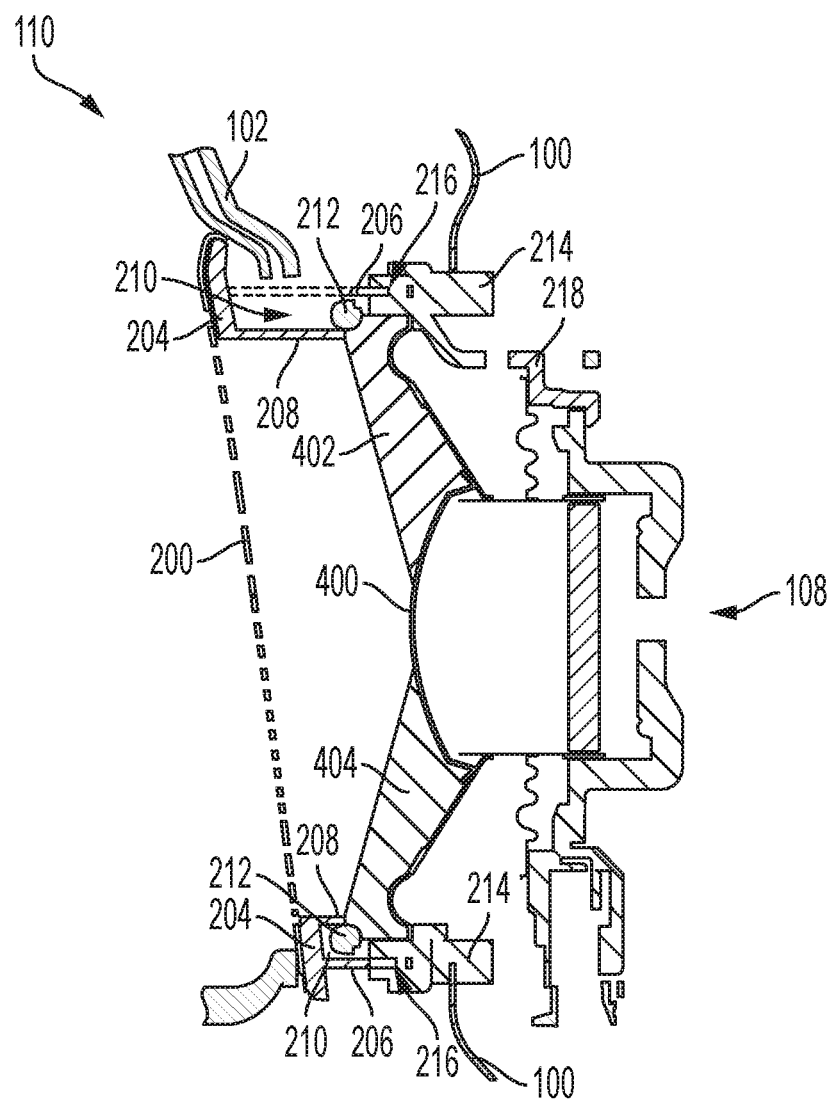
FIG. 4 is a cross-sectional view of the example embodiment of an illuminated speaker panel assembly shown in FIG. 3 taken along line 4-4.

FIG. 4 is a cross-sectional view of the example embodiment of illuminated speaker panel assembly 110 shown in FIG. 3 taken along line 4-4. In an example embodiment, lighting member 212 is configured to provide an approximately uniform cylindrical illumination of speaker 108. For example, as shown in FIG. 4, lighting member 212 disposed within channel 210 of speaker frame 204 illuminates at least a speaker cone 400 of speaker 108. That is, lighting member 212 extends substantially along the outer periphery of speaker 108 so as to evenly and uniformly illuminate speaker 108. With this arrangement, illuminated speaker cone 400 of speaker 108 may be visible through the plurality of openings in grille 200 by an occupant of the interior passenger compartment of the vehicle.

Additionally, speaker frame 204 provides a screen or mask for at least a portion of the light distributed from lighting member 212 to direct the light towards speaker cone 400 of speaker 108. In an example embodiment, when lighting member 212 is disposed within channel 210 of speaker frame 204 formed by outer sealing wall 206 and inner retention wall 208, at least a portion of lighting member 212 is blocked by outer sealing wall 206 and inner retention wall 208. As a result, the light from lighting member 212 is directed towards speaker cone 400 of speaker 108. For example, as shown in FIG. 4, light from lighting member 212 includes a first illumination pattern 402 illuminating speaker cone 400 of speaker 108 from above and a second illumination pattern 404 illuminating speaker cone 400 of speaker 108 from below.

In an example embodiment, lighting member 212 extends substantially along the outer periphery of speaker 108 so that a similar illumination pattern of light will uniformly illuminate speaker cone 400 of speaker 108 from all sides (i.e., approximately 360 degrees). The concentric geometry of lighting member 212, outer sealing wall 206, and speaker 108 provide a substantially uniform illumination of speaker 108. Additionally, as can be seen in FIG. 4, because inner retention wall 208 blocks a portion of lighting member 212, light from lighting member 212 is prevented or blocked from being spread towards grille 200. Accordingly, a substantially uniform illumination of speaker cone 400 of speaker 108 is provided within the interior passenger compartment of the vehicle.

Figure 5:
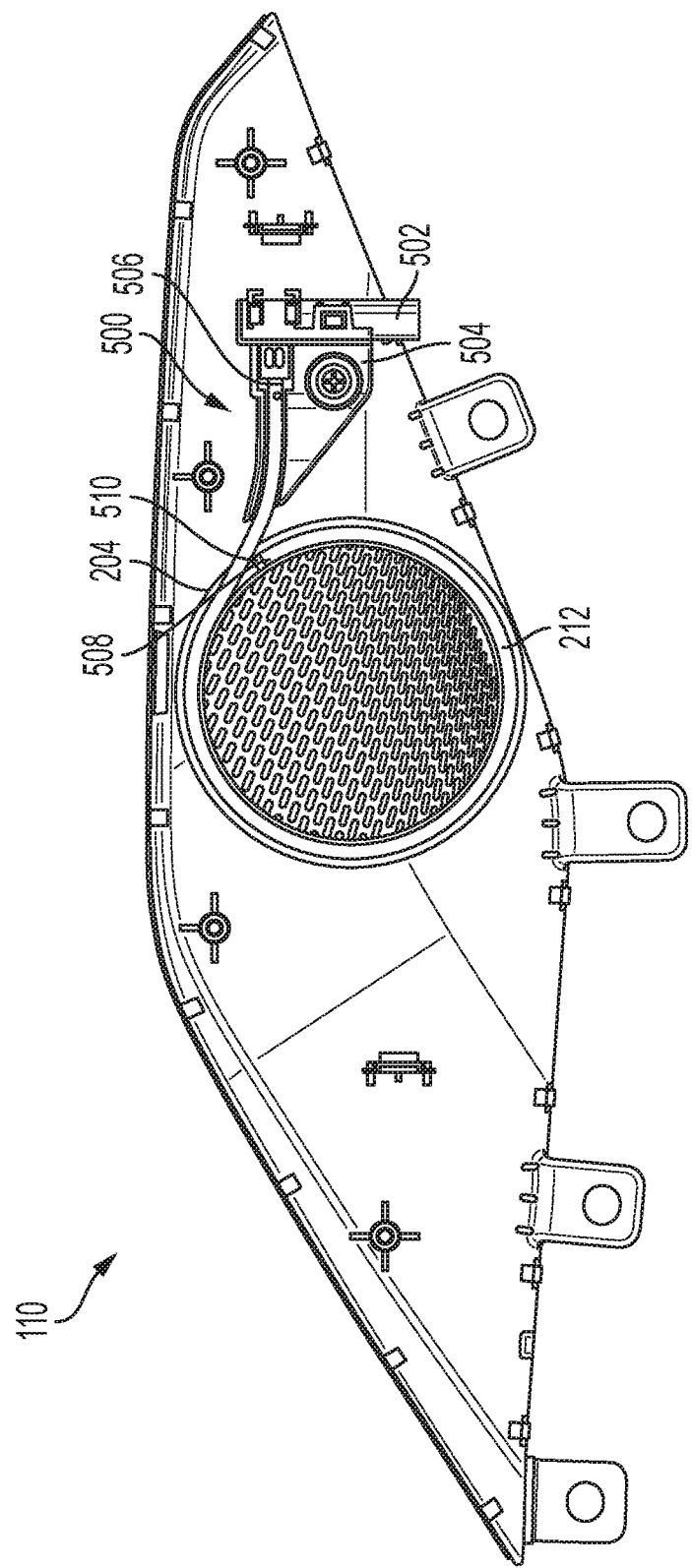
FIG. 5 is a rear view of an example embodiment of an illuminated speaker panel assembly.

FIG. 5 is a rear view of an example embodiment of illuminated speaker panel assembly 110. In some embodiments, illuminated speaker panel assembly 110 may include a lighting assembly 500 to provide illumination to the speaker panel assembly. In an example embodiment, lighting assembly 500 may be mounted or attached to a backside or rear (i.e., facing away from the interior passenger compartment) of base component 202 of illuminated speaker panel assembly 110. That is, lighting assembly 500 is located between grille 200 exposed on the interior of the passenger compartment and interior door panel 102 of door body 100.

In an example embodiment, lighting assembly 500 includes components configured to provide illumination for illuminated speaker panel assembly 110. In this embodiment, lighting assembly 500 includes lighting member 212, described above. As shown in FIG. 5, lighting member 212 has an approximately circular cross-sectional shape and extends substantially around an outer periphery of a speaker (e.g., speaker 108, shown in FIGS. 2 and 4 above).

Lighting assembly 500 also includes a light source 502 configured to illuminate lighting member 212. In one embodiment, light source 502 may be light-emitting diode (LED) light driver that provides light to lighting member 212. In other embodiments, light source 502 may be a different type of light source, such as a filament bulb or other mechanism that can provide light. As described above, lighting member 212 is configured to distribute the light from light source 502 along its length surrounding speaker 108.

In an example embodiment, lighting assembly 500 may also include a lighting member holder 504. Lighting member holder 504 includes a mechanism to hold light source 502 in place on the back side of base component 202 of illuminated speaker panel assembly 110. Lighting member holder 504 is also configured to retain a first end 506 of lighting member 212 in communication with light source 502. In some embodiments, lighting member holder 504 may also include mounting components to allow lighting member holder 504 to be mounted or attached to the back side of base component 202 of illuminated speaker panel assembly 110.

In some embodiments, lighting assembly 500 may also include a cap 510 that is configured to fit onto a second end 508 of lighting member 212. For example, as shown in FIG. 5, cap 510 connects to second end 508 of lighting member 212 to block light from exiting lighting member 212 at second end 508. Because lighting member 212 is configured to transmit the light provided by light source 502, the light would spread outward from second end 508 at lighting member 212, resulting in a "hot spot" or area where the otherwise uniform illumination of speaker 108 would be non-uniform. Cap 510 disposed on second end 508 of lighting member 212 blocks the light from exiting second end 508, thereby preserving the substantially uniform illumination of speaker 108.

Figure 6:
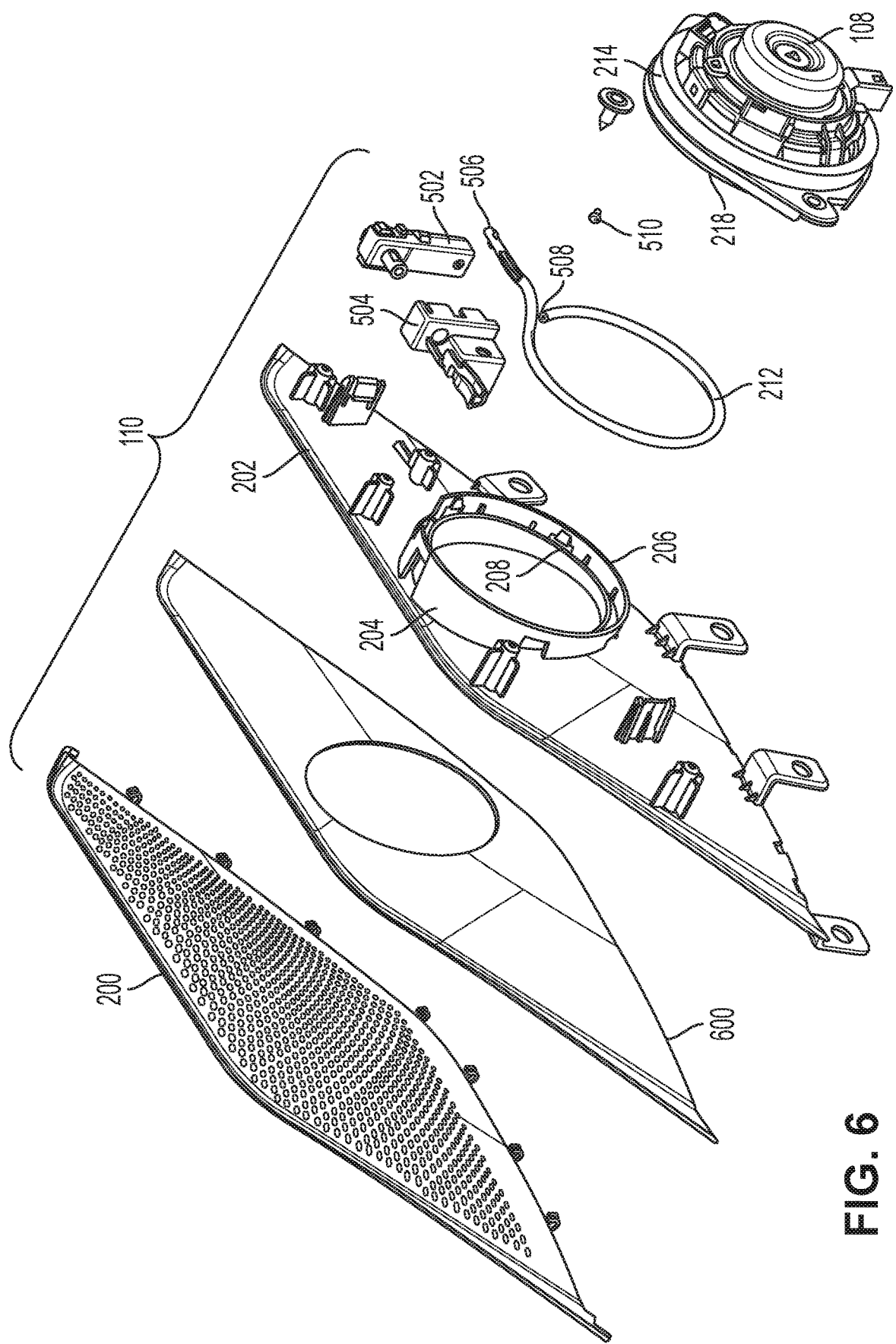
FIG. 6 is an exploded view of an example embodiment of an illuminated speaker panel assembly.

FIG. 6 is an exploded view of an example embodiment of illuminated speaker panel assembly 110 to show the various components of illuminated speaker panel assembly 110 in a disassembled configuration. As shown in this embodiment, illuminated speaker panel assembly 110 includes grille 200 exposed to an interior of the vehicle, base panel component 202 including speaker frame 204, and lighting assembly 500. In some embodiments, a lining layer 600 may be disposed between grille 200 and base panel component 202. In an example embodiment, lining layer 600 is a thin layer of polyester fabric or other material that is configured to absorb light and/or reduce vibration from speaker 108. In this embodiment, lining layer 600 has a substantially similar shape and size as grille 200 and base panel component 202, including an opening that corresponds with and aligns with speaker frame 204 of base panel component 202.

As described above, components of lighting assembly 500 are configured to attach or mount on the back side of base panel component 202. For example, as shown in FIG. 6, lighting member 212 fits into channel 210 of speaker frame 204 formed by outer sealing wall 206 and inner retention wall 208. Lighting member holder 504 attaches to the back side of base panel component 202 and is configured to hold light source 502 and first end 506 of lighting member 212 in communication with each other. Additionally, cap 510 fits onto second end 508 of lighting member 212 so as to prevent or block light from extending out of second end 508 and creating "hot spots" that disrupt the uniform illumination of speaker 108.

In this embodiment, speaker 108 is shown unmounted from door body 100 for ease of illustration. Seal 214 extends substantially around the outer periphery of speaker 108. As described above, groove 216 in seal 214 receives outer sealing wall 206 so as to provide an integrated audio seal for illuminated speaker panel assembly 110.

Figure 7:
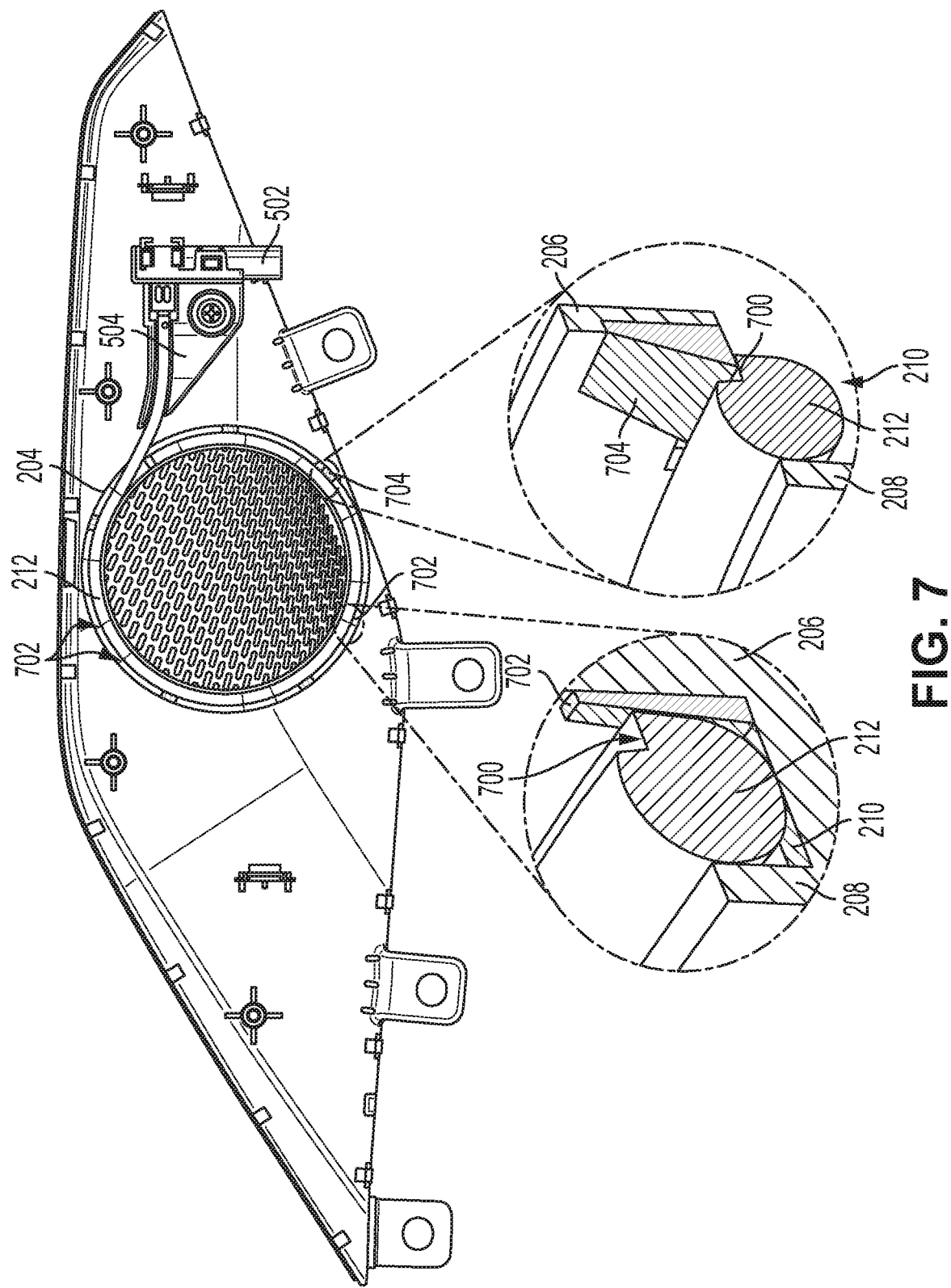
FIG. 7 is a detailed view of an example embodiment of a speaker frame of an illuminated speaker panel assembly.

Referring now to FIG. 7, a detailed view of an example embodiment of speaker frame 204 of illuminated speaker panel assembly 110 is shown. In some embodiments, speaker frame 204 of base panel component 202 of illuminated speaker panel assembly 110 may include features configured to secure and/or retain lighting member 212 within channel 210.

In an example embodiment, lighting member 212 has an approximately circular cross-sectional shape with an angular groove 700 extending along a length of lighting member 212. For example, as shown in FIG. 7, angular groove 700 is disposed along the length of lighting member 212 proximate or adjacent to outer sealing wall 206 of speaker frame 204. In this embodiment, angular groove 700 includes two substantially planar or flat surfaces forming an approximately 90 degree angle. In other embodiments, angular groove 700 may have a different configuration.

In an example embodiment, speaker frame 204 of base panel component 202 includes a plurality of adjustment ribs 702 disposed within channel 210 formed by outer sealing wall 206 and inner retention wall 208. Plurality of adjustment ribs 702 are thin strips of plastic or other material that fit within channel 210 and act as a shim between lighting member 212 and outer sealing wall 206 of speaker frame 204. With this arrangement, plurality of adjustment ribs 702 can reduce the space between the outer surface of lighting member 212 and the walls of channel 210 formed by outer sealing wall 206 and inner retention wall 208.

In this embodiment, plurality of adjustment ribs 702 are located at various intervals along the perimeter of speaker frame 204. For example, in FIG. 7, plurality of adjustment ribs 702 include twelve adjustment ribs located along portions of the perimeter of speaker frame 204. In some cases, plurality of adjustment ribs 702 may be located at regular intervals (e.g., approximately 30 degrees apart). In other cases, plurality of adjustment ribs 702 may be located at irregular intervals (i.e., some adjustment ribs may be closer together than others). With this arrangement, plurality of adjustment ribs 702 are configured to provide a pressure fit for lighting member 212 within channel 210 of speaker frame 204.

In an example embodiment, speaker frame 204 of base panel component 202 includes a plurality of retaining tabs 704 disposed within channel 210 formed by outer sealing wall 206 and inner retention wall 208. Plurality of retaining tabs 704 are wedge-shaped members made of plastic or other material that fit within channel 210 and act as a wedge between angular groove 700 of lighting member 212 and outer sealing wall 206 of speaker frame 204. With this arrangement, plurality of retaining tabs 704 can assist with securing and retaining lighting member 212 within channel 210 formed by outer sealing wall 206 and inner retention wall 208.

As shown in FIG. 7, speaker frame 204 includes plurality of retaining tabs 704 disposed along one wall of channel 210 formed by outer sealing wall 206. Each retaining tab 704 has an approximately trapezoidal or wedge-shaped configuration with a wide, flat end that is configured to engage one of the two substantially planar or flat surfaces of angular groove 700 disposed along the length of lighting member 212. In an example embodiment, outer sealing wall 206 includes a shallow recess or notch configured to receive plurality of retaining tabs 704. With this arrangement, plurality of retaining tabs 704 may engage with angular groove 700 in lighting member 212 to secure lighting member 212 within channel 210 of speaker frame 204.

In this embodiment, plurality of retaining tabs 704 are located at various intervals along the perimeter of speaker frame 204. For example, in FIG. 7, plurality of retaining tabs 704 include five adjustment ribs located along portions of the perimeter of speaker frame 204. In some cases, plurality of retaining tabs 704 may be located at regular intervals (e.g., approximately 72 degrees apart). In other cases, plurality of retaining tabs 704 may be located at irregular intervals (i.e., some retaining tabs may be closer together than others). With this arrangement, plurality of retaining tabs 704 are configured to secure and/or retain lighting member 212 within channel 210 of speaker frame 204.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. An illuminated speaker panel assembly for a vehicle comprising:
   a speaker configured to mount to a door body of a vehicle;
   a base panel component configured to attach to the door body over the speaker, the base panel component including a speaker frame aligned with an outer periphery of the speaker, the speaker frame comprising:
   an outer sealing wall;
   an inner retention wall; and
   a channel disposed between the outer sealing wall and the inner retention wall;
   a lighting member disposed within the channel of the speaker frame, wherein the lighting member is configured to extend substantially along the outer periphery of the speaker; and
   a seal surrounding the outer periphery of the speaker, wherein the seal includes a groove that is configured to receive the outer sealing wall of the speaker frame.

2. The illuminated speaker panel assembly of claim 1, wherein the outer sealing wall, the inner retention wall, the lighting member, and the seal cooperate to provide an audio seal for the speaker.

3. The illuminated speaker panel assembly of claim 1, further comprising:
   a grille configured to be exposed to an interior of the vehicle; and
   a lining layer disposed between the grille and the base panel component.

4. The illuminated speaker panel assembly of claim 1, further comprising:
   a light source configured to illuminate the lighting member; and
   a lighting member holder configured to retain a first end of the lighting member in communication with the light source.

5. The illuminated speaker panel assembly of claim 4, further comprising a cap that is configured to fit onto a second end of the lighting member to block light from exiting the lighting member at the second end.

6. The illuminated speaker panel assembly of claim 1, wherein the lighting member has an approximately circular cross-sectional shape with an angular groove extending along a length of the lighting member.

7. The illuminated speaker panel assembly of claim 6, wherein the speaker frame includes a plurality of adjustment ribs within the channel; and
   wherein the adjustment ribs are configured to provide a pressure fit for the lighting member within the channel of the speaker frame.

8. The illuminated speaker panel assembly of claim 6, wherein the speaker frame includes a plurality of retaining tabs disposed along the outer sealing wall; and
   wherein the plurality of retaining tabs engage with the angular groove in the lighting member to secure the lighting member within the channel of the speaker frame.

9. A lighting assembly of a speaker panel assembly for a vehicle, the lighting assembly comprising:
- a lighting member having an approximately circular cross-sectional shape and configured to extend substantially around an outer periphery of a speaker;
- a light source configured to illuminate the lighting member;
- a lighting member holder configured to retain a first end of the lighting member in communication with the light source; and
- a cap that is configured to fit onto a second end of the lighting member to block light from exiting the lighting member at the second end.

10. The lighting assembly of claim 9, wherein the lighting member has an angular groove extending along a length of the lighting member.

11. The lighting assembly of claim 10, further comprising a base panel component that is configured to attach to a door body of a vehicle over the speaker, the base panel component including a speaker frame comprising:
- an outer sealing wall;
- an inner retention wall; and
- a channel disposed between the outer sealing wall and the inner retention wall; and
- wherein the lighting member is disposed within the channel of the speaker frame.

12. The lighting assembly of claim 11, wherein the speaker frame includes a plurality of retaining tabs disposed along the outer sealing wall; and
- wherein the plurality of retaining tabs engage with the angular groove in the lighting member to secure the lighting member within the channel of the speaker frame.

13. An illuminated speaker panel assembly for a vehicle comprising:
- a base panel component configured to attach to a door body of a vehicle, the base panel component including a speaker frame comprising:
  - an outer sealing wall;
  - an inner retention wall; and
  - a channel disposed between the outer sealing wall and the inner retention wall;
- a lighting assembly comprising:
  - a lighting member including a first portion, including a first end, disposed outside of the channel of the speaker frame, and a second portion, including a second end, disposed within the channel of the speaker frame, the lighting member having an approximately circular cross-sectional shape;
  - a light source configured to illuminate the first end of the lighting member; and
  - a lighting member holder attached to the base panel component away from the channel, the lighting member holder configured to retain the first portion of the lighting member and hold the first end in communication with the light source; and
- a grille configured to be exposed to an interior of the vehicle.

14. The illuminated speaker panel assembly of claim 13, further comprising a seal including a groove that receives the outer sealing wall of the speaker frame.

15. The illuminated speaker panel assembly of claim 14, wherein the outer sealing wall, the inner retention wall, the lighting member, and the seal cooperate to provide an audio seal.

16. The illuminated speaker panel assembly of claim 13, wherein the lighting member has an angular groove extending along a length of the lighting member.

17. The illuminated speaker panel assembly of claim 16, wherein the speaker frame includes a plurality of retaining tabs disposed along the outer sealing wall; and
- wherein the plurality of retaining tabs engage with the angular groove in the lighting member to secure the second portion of the lighting member within the channel of the speaker frame.

18. The illuminated speaker panel assembly of claim 13, wherein the speaker frame includes a plurality of adjustment ribs within the channel; and
- wherein the adjustment ribs are configured to provide a pressure fit for the second portion of the lighting member within the channel of the speaker frame.

* * * * *